Feb. 7, 1967   G. H. BINGHAM, JR   3,303,250
METHOD OF MAKING OUTER SOLES FOR FOOTWEAR
Original Filed June 12, 1962   3 Sheets-Sheet 1

INVENTOR.
GEORGE H. BINGHAM, JR.
BY
ATTORNEYS

Feb. 7, 1967  G. H. BINGHAM, JR  3,303,250
METHOD OF MAKING OUTER SOLES FOR FOOTWEAR
Original Filed June 12, 1962  3 Sheets-Sheet 2
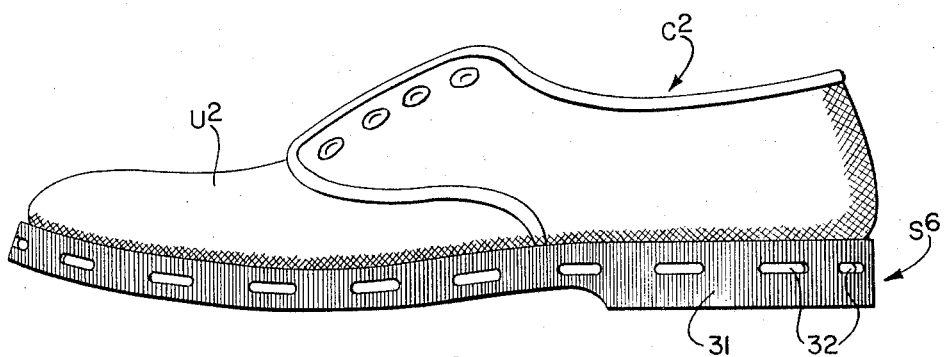
FIG. 5
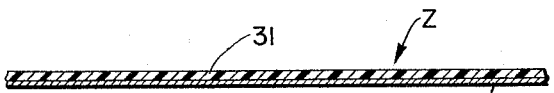
FIG. 7
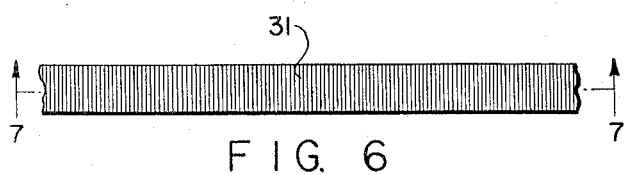
FIG. 6
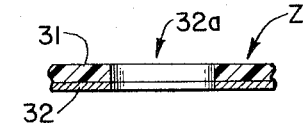
FIG. 8
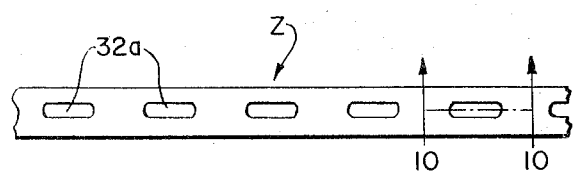
FIG. 9
FIG. 10
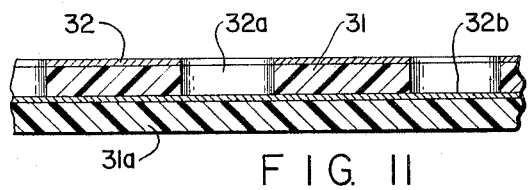
FIG. 11
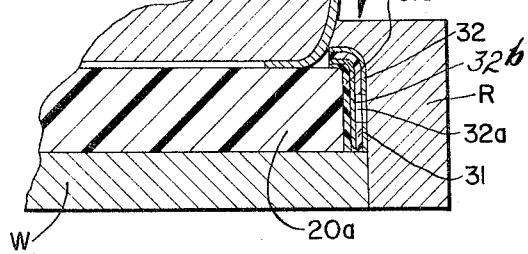
FIG. 12
INVENTOR.
GEORGE H. BINGHAM, JR.
BY
ATTORNEYS Feb. 7, 1967    G. H. BINGHAM, JR    3,303,250
METHOD OF MAKING OUTER SOLES FOR FOOTWEAR
Original Filed June 12, 1962    3 Sheets-Sheet 3

INVENTOR.
GEORGE H. BINGHAM, JR.
BY
ATTORNEYS

United States Patent Office 3,303,250
Patented Feb. 7, 1967

3,303,250
METHOD OF MAKING OUTER SOLES
FOR FOOTWEAR
George H. Bingham, Jr., Westminster, Md., assignor to
Cambridge Rubber Company, Taneytown, Md., a corporation of Maryland
Original application June 12, 1962, Ser. No. 201,950, now
Patent No. 3,138,881, dated June 30, 1964. Divided
and this application Feb. 26, 1964, Ser. No. 347,584
2 Claims. (Cl. 264—145)

This application is a division of my pending application Serial No. 201,950, filed June 12, 1962, since issued as Patent No. 3,138,881, dated June 30, 1964.

This invention pertains to footwear, more especially to footwear of the kind wherein the outer sole is of an elastomer, for instance rubber or a synthetic plastic, and relates more especially to a novel method of making such an outer sole and/or a shoe having such an outer sole, and to an outer sole resultant from the practice of said method. Customarily, such outer soles are made, either as independent articles or concomitantly with their attachment to a lasted shoe upper, by various methods including slush-molding, injection molding or machine molding, but whether made by one or another of said methods as previously and customarily performed, the exposed surface of the completed outer sole not infrequently shows imperfections, for instance irregular sunken areas and, at best, the exposed surface or surfaces of such an outer sole in most instances is or are uninteresting in texture and/or color.

An object of the present invention is to provide a novel method of so making such outer soles as to minimize the occurrence of defects in the exposed surface of the sole. A further object is to provide a method of making an outer sole of the above type wherein a pleasing and/or unique texture may be imparted to the exposed surface of the outer sole. A further object is to provide a method of making such an outer sole whereby its outer surface may be provided with ornamental effects, for example wherein the color of the exposed surface or a portion of the exposed surface of the outer sole may be different from that of the normal color of the material constituting the body of the outer sole or may have specific areas of contrasting color or areas of contrasting texture. A further object is to provide a novel method whereby differently colored areas may be provided without intermingling of adjacent colors. A further object is to provide a novel shoe sole consisting in major proportion of a synthetic plastic but whose exposed surface or surfaces, or selected areas of a surface or surfaces is or are different in texture and/or color from the normal color of the elastomer. A further object is to provide a novel method of preparing an outer sole blank, useful in the preparation of an outer sole, having improved characteristics.

Other and further objects and advantages of the invention will be pointed out in the following more detailed description and by reference to the accompanying drawings wherein:

FIG. 5 is a side elevation of a shoe of the same general type as that of FIG. 1, but showing the peripheral edge of the outer sole decorated in a specifically different way, although embodying features of the present invention;

FIG. 6 is a plan view of a length of ribbon of elastomeric material, for example a synthetic plastic, and which is of a color selected to provide a desired surface coloration for the major portion of the peripheral edge of the sole of the shoe of FIG. 5;

FIG. 7 is a section on the line 7—7 of FIG. 6;

FIG. 8 is a section in the same plane as FIG. 7, but showing the ribbon of FIGS. 6 and 7 as having had combined therewith a ply of thin sheet cellulosic material thereby to form a composite lamellar ribbon in accordance with the practice of the present invention;

FIG. 9 is a plan view of the lamellar ribbon of FIG. 8, but showing it as having been provided with a series of perforations or slots extending through both plies;

FIG. 10 is a section, to larger scale, on the line 10—10 of FIG. 9;

Figure 13:
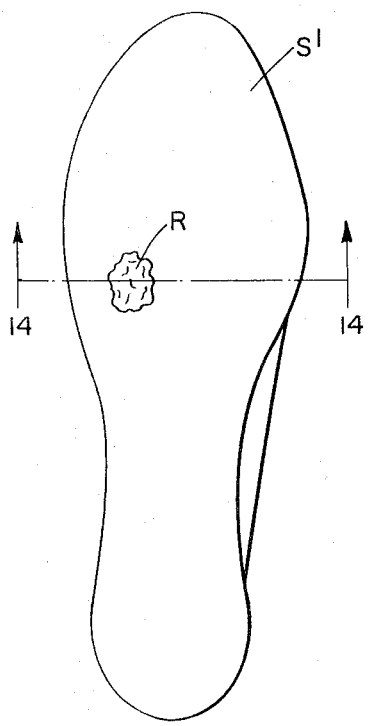
Figure 15:
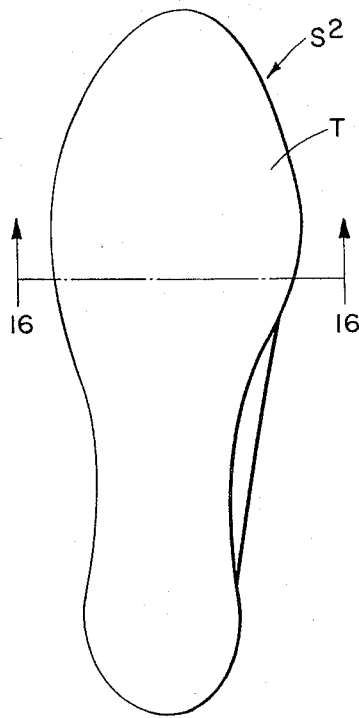
Figure 14:
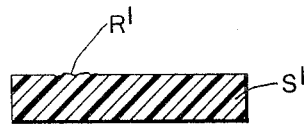
Figure 16:
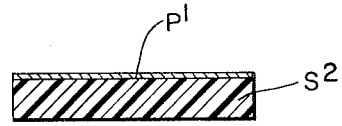
Figure 17:
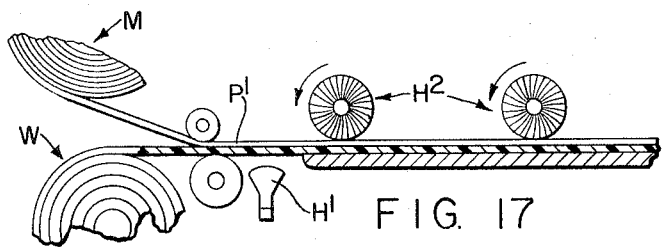
Figure 18:
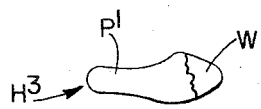

FIG. 11 is a fragmentary section, to very large scale, in the same plane as FIG. 10, but showing the two-ply ribbon of FIG. 10 as having been combined with a second two-ply but imperforate ribbon comprising a ply of plastic of a color contrasting with that of the ribbon of FIGS. 6 and 7, and a ply of thin cellulosic material such as paper, the latter ply contacting the plastic ply of the ribbon of FIG. 8;

FIG. 12 is a fragmentary, transverse section through a mold such as is customarily employed in bonding a partially cured outer sole blank to a lasted shoe upper but showing a composite ribbon, such as that of FIG. 11, as having been interposed between the peripheral edge of the sole blank and the inner surface of the side wall of the mold;

FIG. 13 is a plan view showing the bottom of an outer sole made in accordance with customary practice and illustrating such a defect as often occurs in an outer sole so made;

FIG. 14 is a section on the line 14—14 of FIG. 13;

FIG. 15 is a plan view of an outer sole similar to that of FIG. 13, but made in accordance with the present invention, and thus having a tread surface which is completely free from blemishes, such as those illustrated in FIG. 13;

FIG. 16 is a section on the line 16—16 of FIG. 15, illustrating the means whereby, in accordance with the present invention, the occurrence of blemishes on the tread surface of the sole is prevented;

FIG. 17 is a diagrammatic elevation illustrative of one way of preparing an outer sole blank according to the present invention; and FIG. 18 is a view showing the tread surface of an outer sole blank made in accordance with the procedure illustrated in FIG. 17.

The present invention is based upon the discovery that if a thin cellulosic sheet material, for instance paper, having certain characteristics be interposed between the inner surface of a mold in which an elastomer in moldable condition is to be molded under pressure and heat, the sheet material, while imparting certain of its characteristics to the outer integumental portion of the molded element, becomes so thoroughly incorporated in the latter as completely to lose its identity as an independent ply. For example, if the sheet material be of a color contrasting with that of the elastomer itself, its presence will so modify the molded material that the color of the latter at its exposed surface, will be significantly different from that of the normal elastomer. Further, although the sheet material loses its identity as such, it so modifies the surface texture of the molded element as to impart novel characteristics to the latter dependent upon the character of the sheet material employed. A further result is that the exposed surface of the molded article, at those areas where the sheet material is present, presents a uniform appearance devoid of the defects which so often appear in articles molded in accordance with usual practice. Moreover, the sheet material is effective to prevent flow of coloring substances between adjacent areas. Thus, when different colors are applied in juxtaposition to the surface of the sole blank no substantial intermingling of the colors takes place.

Manifestly, the sheet material employed, in accordance with the present invention, in order to obtain the above desired effects, must be porous and bibulous so that it is readily permeated or infused with the elastomeric material under the conditions of molding and must be without permanent and regular structure (such as that of a textile fabric), so that the sheet material may lose its identity as an independent element as its constituents fibers are more-or-less dispersed and absorbed into the flowable elastomer. Herein, in order clearly to distinguish from the use of reinforcing fabrics made from spun yarns, the cellulosic fibers here employed are identified as "paper length" fibers, meaning that they are very short, for instance two to three mm. in length as compared with the staple length fibers used in textiles. Cotton fibers less than ¾ inch in length (19 mm.) are frequently rated as "linters" and are generally used in felting or as padding (page 38, "Handbook of Industrial Fabrics," Second Edition, Wellington Sears Company, New York). Fibers less than ¼ inch (6.35 mm.) in length are substantially unspinnable by conventional methods. Such fibrous sheet material for convenience in description and to distinguish it from woven textile fabrics for example, my hereinafter be referred to as "textureless" which, as defined in Funk & Wagnall's New Standard Dictionary means "having no proper structure; exhibits no minute structural order." Among such cellulosic sheet materials which have been found useful for the purpose are those coming within the general designation of "cellulose wadding" and certain very thin and finely creped papers or tissues substantially devoid of sizing. For example, a paper having the above desired characteristics is that manufactured by Baltimore Warner Paper Company of Baltimore, Maryland, under the registered trade name "Kimpak." This paper is of a cellulosic stock; and of a weight of the order of from 0.053 to 0.057 ounce per square foot; it is very soft, flexible and tenuous; is characterized by the presence of a multitude of irregular holes, for the most part microscopic, but occasionally of readily visible size; and is usually available in white or in shades of brown. The white paper is easily colored by spraying it with a dispersion or solution of powdered dye stuff in water.

A further advantage, from the manufacturing standpoint, is that when the sheet material, as above described, is that when the thin sheet material is interposed between the elastomer and the mold, it acts to prevent elastomer from adhering to the mold surface, and thus the frequent cleaning of the molds, such as is ordinarily necessary, is eliminated.

Referring to the drawings the character C (FIG. 1) indicates a shoe of the so-called "casual type" having the upper U which may be of textile fabric or leather and the outer sole S, the major portion, at least, of which is a unitary body of a molded elastomer, for example a synthetic plastic. It may be assumed, for purposes of description, but without limiting intent, that, in accordance with prior practice, this outer sole, or at least the body portion thereof, is first die-cut from a sheet of partially cured elastomer, the result being that the peripheral edge of the blank thus made is substantially vertical. The shoe upper having been prepared and lasted, the blank of partially cured elastomer is placed in the mold of a molding machine of a well-known type. The lasted upper is then placed upon the blank and the parts subjected to pressure and heat such as concomitantly to shape the plastic blank to the contour of the inner surface of the mold while bonding the upper surface of the blank to the bottom of the lasted upper.

Such a procedure, without modification according to the present invention, produces a shoe whose outer sole has a peripheral edge surface which is of the color of the material of the blank and which, if no defects are developed in molding, exhibits a surface texture or finish according to the surface of the wall of the mold, usually smooth and glossy. Likewise, the undersurface of the completed outer sole throughout its entire extent would be of the same color as the elastomer employed in making the blank and its surface texture would be such as results from contact of the elastomer directly with the bottom of the mold. A shoe thus prepared, because of the thickness of the outer sole and the wide and unbroken extent of the exposed elastomer, is lacking in artistic appeal and is thus largely relegated to sportswear.

Figure 1:
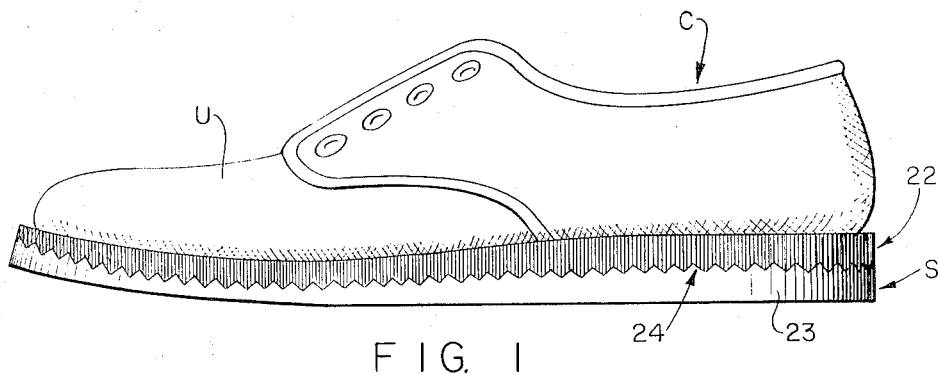
FIG. 1 is a side elevation illustrative of a shoe of a conventional type except that the peripheral edge and tread surface of its outer sole are decorated in accordance with the method of the present invention.

In accordance with the present invention, as illustrated in FIG. 1, the upper portion 22 of the peripheral edge of the outer sole is indicated as of a color different from that of the lower portion 23, with the line 24 of demarcation between these differently colored areas illustrated as serrated or scalloped.

Figure 2:
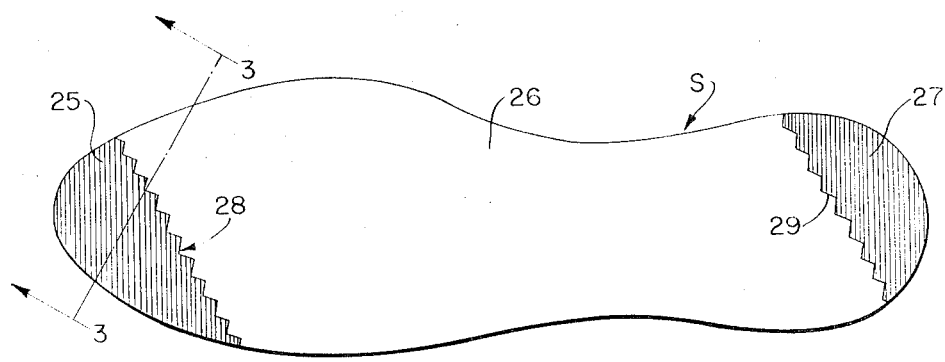
FIG. 2 is a bottom view of the shoe of FIG. 1, showing a type of decoration which may be applied to the tread surface of the outer sole.

Likewise, a toe-end portion 25 (FIG. 2) of the tread surface 26 of the outer sole is indicated as of a color different from that of the major portion of said tread surface and, in the same way, an area 27 at the heel end of a different color from the major portion 26, the colored portions 25 and 27 being bounded by serrated lines 28 and 29 respectively.

In the attainment, according to the present invention, of effects such as shown in FIGS. 1, 2, 3 and 3a, there may be provided a tape or ribbon P (FIG. 3a) of paper of a kind such as hereinabove suggested, and, assuming that the lower portion 23 of the periphery of the outer sole is to be white, the paper selected for the ribbon P would be white, as indicated at 23a, and, assuming that the upper portion 22 of the peripheral surface is to be red, then, for example, with the aid of a stencil, the upper portion 22a of the ribbon P would be colored red as, for instance, by spraying it with a red dye.

In preparing the bottom of the outer sole so as to appear as shown in FIG. 2, and, again, assuming that the major portion 26 is to be white and the toe and heel areas to be red, a piece of the selected paper (white) would be cut by means of a die to the contour of the tread surface of the outer sole and then, by means of a stencil or otherwise, the areas 25 and 27 would be colored red.

Then, before placing the sole blank of partially cured plastic in the mold, preparatory to molding according to usual practice, the piece of paper thus cut, as just described, to the shape of the tread surface of the outer sole and colored as suggested, would be placed in the mold with its colored surface areas 25 and 27 in contact with the bottom of the mold; then the ribbon P would be wrapped around the peripheral edge of the moldable sole blank and preferably adhesively attached thereto with its colored area exposed; and then the so modified blank would be placed within the mold cavity and the operation of molding the blank and bonding it to the lasted upper would proceed in customary manner.

Figures 3, 3A:
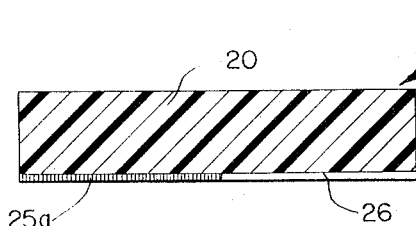
FIG. 3 is a section, to larger scale, on the line 3—3 of FIG. 2, suggestive of the character of the decoration of both the peripheral edge of the outer sole and of the tread surface of the outer sole.
FIG. 3a is a fragmentary elevation showing a ribbon or tape such as may be employed in decorating the peripheral edge of the outer sole.
Figure 3B:
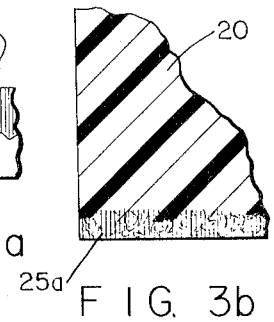
FIG. 3b is a fragmentary section in the same plane as FIG. 3, but to larger scale, showing the left-hand lower corner portion of the outer sole of FIG. 3, but to a scale such as to indicate the internal structure of the ornamentation.

The result is that the paper so interposed between the blank proper and the mold is absorbed by the action of the heat and pressure into the substance of the elastomer so that, as diagrammatically illustrated in FIG. 3b, the fibers 25a which constituted the paper are now partially dispersed within the substance of the body 20 of elastomer thereby imparting to a thin integumental layer of the outer sole, at the areas 25 and 27, a color which is distinctively different from that of the elastomer itself. Likewise, the paper strip P, initially white and only colored in its upper portion, will impart to the peripheral edge surface of the outer sole an appearance or texture differing from that of the original elastomer. For example, if the original elastomer be white, the exposed portion 22 of the edge of the outer sole will be red while, although the lower part 23 of the edge will be white, its texture will be different from that of the original elastomer. It is, of course, obvious that the paper strip P might initially be of some other color than white and, likewise, if initially white, its upper and lower areas might be dyed differently before application to the sole blank and the same is true of the treatment of the paper which is integrated with the tread surface of the sole blank. It is further manifest that the paper ribbon P instead of being colored in the same way throughout its peripheral extent may be colored according to any desired pattern, either geometric, floral, or otherwise, and it is further obvious that, if desired, the paper tape P may be of a width less than the thickness of the outer sole blank, leaving a portion of the width of the latter exposed and with its natural color and texture. In the same way, instead of covering the entire tread surface of the blank with paper, only selected areas thereof may be so covered. Moreover, it is contemplated that the surface of the sheet material which is to be exposed, after said sheet material has been assembled with the blank, may be given a more distinctive texture, for example, by coating it with flock fiber.

It is thus clear that by the practice of this method, the outer sole of the shoe may be ornamented by color or texture effects according to a limitless number of patterns and that regardless of the initial color of the elastomer employed, the outer sole may be colored in a distinctively different way.

The absorption of the very fine fibers constituting the paper into the integumental area of the outer sole blank imparts to the latter a distinctive texture and feel which is quite different from that of the bare plastic even though the sheet material which is employed be of a single color, for example like that of the elastomer itself. Moreover, whereas outer soles, as customarily made often show irregular spots of distinctive appearance, such, for example, as shallow depressions or the rough area $R^1$ on the tread surface of the sole $S^1$ (FIGS. 13 and 14), such as result, for example, from the trapping of air in the mold, the tread surface T of the sole $S^2$, as shown in FIGS. 15 and 16, and which was prepared in accordance with the present invention is smooth and without appreciable blemish.

If, as just suggested, the sole is to be of a single color, for example a color approximating that of the elastomer itself, the selected paper $P^1$ (FIG. 17) may be applied, if desired, to the extruded, uncured slab of elastomer from which the soles are to be die-cut, rather than to the pre-cut sole blank or to the mold. Thus, the paper $P^1$ (FIGS. 17 and 18), supplied in a roll M, may be unwound and freed from wrinkles and then, while under slight tension, brought into contact with a slab of uncured elastomer (drawn off from a supply roll W) as the slab is advanced by a conveyor or the like, the paper being pressed into adhering contact with the slab, for example, by bristle brushes $H^2$. Preferably, the slab of uncured elastomer is heated by heating means $H^1$ to a degree such that its surface is so tacky and soft that the fibers of the paper become embedded in the sole surface prior to the application of molding pressure.

From this uncured slab with its adherent surface coat of paper, sole blanks $H^3$ (FIG. 18) may now be die-cut in the usual manner. In molding the sole from such a composite blank the paper covered surface of the blank is placed in contact with that surface of the mold which shapes the tread surface of the sole.

Figure 4:
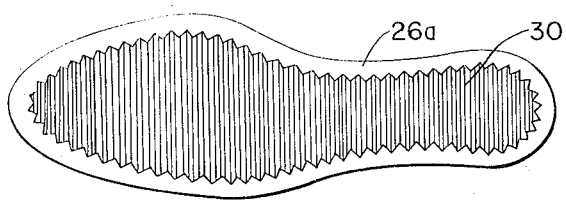
FIG. 4 is a view similar to FIG. 2, but illustrative of another type of decoration which may be applied to the bottom surface of the outer sole.

In FIG. 4 there is illustrated merely by way of further example another pattern which may be provided for the tread surface of the outer sole wherein the margin 26a of the tread surface may, for instance, be white, while all of the mid-portion of the tread area may be of some contrasting color as indicated at 30. Such an effect may be produced by a procedure similar to that above described by die-cutting a piece of white paper of proper size and shape to register with the undersurface of the sole blank; then coloring the area 30 in a suitable manner; and then placing this paper on the bottom of the mold with the colored side against the surface of the mold bottom. Alternatively, the paper might be made of the size and shape of the area 30, only, leaving the margin of the blank itself exposed.

In FIG. 5 there is illustrated by way of example a shoe $C^2$ of the same general type as that shown in FIG. 1, but having the upper $U^2$ and the outer sole $S^6$. As shown, the major portion of the peripheral edge of the outer sole is of one color, indicated at 31, but at intervals, extending peripherally of the outer edge, there are elongate areas 32 of a contrasting color.

One procedure which may be followed in making a shoe like that of FIG. 5 is indicated in FIGS. 6 to 12 inclusive. Thus, in FIG. 6 the numeral 31 indicates a ribbon of incompletely cured elastomer. This ribbon may be quite thin, for example of the order of $\frac{1}{32}$ of an inch in thickness. To one face of this ribbon there is then secured, as by means of adhesive, a ribbon 32 (FIG. 8) of paper of the kind above described and which may initially be of the same color as the plastic ribbon 31, or, if white, then it may be colored to match the ribbon 31, for instance, by spraying it with a suitable dye. This composite ribbon Z will be of a width appropriate to cover the peripheral edge of the outer sole blank or such portion thereof as is to be modified in color or texture.

In providing this composite ribbon it may be preferred to start with sheet plastic like that of ribbon 31 of any suitable width but of the thickness of the desired ribbon 31 and then to assemble this sheet with a sheet of the selected paper; then, after adhesively bonding the sheets together, two-ply strips are cut by means of a die or otherwise to form composite ribbons Z. However this composite ribbon may be formed, it is now for the purpose of making a shoe like that of FIG. 5, subjected to a punching operation or otherwise so as to form therein elongate slots 32a (FIG. 9) of the dimensions of the area 32 shown in FIG. 5. Obviously, holes of any shape and disposed to form predetermined patterns may be made instead of the slots here illustrated.

Assuming, for example, that the area 31 (FIG. 5) of the periphery of the outer sole is to be red, while the areas 32 are to be white, the composite ribbon Z would be red, as above suggested. There is now provided a composite ribbon like that shown in FIG. 8, but in which the plastic ply 31a (FIG. 11) and the paper ply 32b are both white. This last-named ribbon and the composite ribbon Z are now assembled in registry and adhesively united so that the paper ply 32b contacts the plastic ply 31 of the ribbon Z.

This four-ply ribbon is now wrapped about the peripheral edge of the partially cured outer sole blank 20a (FIG. 12) with the white plastic ply 31a of the four ply ribbon in contact with the peripheral edge of the outer sole blank and is adhesively joined to the blank. The outer sole blank 20a, with its enveloping ribbon, is now placed in the cavity of the conventional mold $M^2$ upon the mold bottom W, the ring portion R of the mold is brought into position, and the lasted shoe upper $U^2$ is now fitted into the top of the mold cavity. Pressure and heat are now applied so as to conform the blank with its embracing ribbon to the contour of the mold cavity while concomitantly curing the plastic and bonding it to the shoe upper. The result is that when the shoe is taken from the mold, portions of the white ribbon comprising the plies 31a and 32b appear through the slots 32a in contrast to the color of the ply 31 as modified by the incorporated paper ply 32.

One of the novel features of the use of the sheet material, as hereinabove described, is that it prevents colors from contiguous areas from flowing so as to smear or blur the color of other areas. Thus, the paper 32b, which is interposed between the red plastic ply 31 and the white plastic ply 31a, prevents the color of the red ply from bleeding into the openings 32a and thus defacing the white material which appears at these openings; while, at the same time, the paper which has become integrated with the red ribbon, provides the latter with a surface texture having a mat finish as compared with the usual shiny surface of plastic to which paper has not been applied. A shoe such as the shoe of FIG. 5, thus prepared, as a distinctively ornamental appearance and one which has not previously been possible to provide according to any known commercial process. Although reference has herein been made to the employment of a thin sheet material or paper consisting or comprising cellulosic fibers, it is contemplated that a textureless sheet material having similar physical characteristics to that above described, but in which the fibers are other than cellulosic, may be employed in accordance with the present invention whenever such material becomes available and that while certain designs have herein been shown by way of illustration, it will be understood, as above suggested, that these are merely examples and that by the use of the general procedure herein described, it is readily possible to provide footwear of very pleasing appearance and at a cost which is not substantially greater than that incurred in the manufacture of shoes of the same general type but which are substantially devoid of attempted ornament and which are often disfigured by irregularities in the exposed surfaces of the other sole. Likewise, it is evident that by a similar procedure other elements, basically of a moldable elastomer, may be ornamented or modified, as well as the outer soles for shoes as above specifically referred to. It will further be understood that all modifications either of procedural steps or of materials employed or specific designs are by way of example and that all modifications such as may be considered equivalents of the inventive features here claimed are within the scope of the invention.

I claim:
1. That method of preparing an outer sole of elastomeric material which comprises as a preliminary step: warming a slab of uncured thermoplastic elastomeric material of a thickness appropriate to form an outer sole blank; bringing into adhering contact with said slab a textureless fibrous sheet of bibulous, cellulosic material whose weight per square foot is of the order of 0.055 ounce; applying pressure to the parts such as permanently to bond the sheet material to the slab; cutting a composite sole blank from said slab; placing the composite blank within a sole mold so that the sheet material contacts a surface of the sole mold; and applying heat and pressure such as to infuse said sheet material with the elastomeric material of the blank whereby the sheet material loses its identity as an independent element.

2. The method of providing an outer sole of elastomeric material with an edge which shows a pattern of contrasting colors which comprises as steps: providing a conventional mold useful in shaping the desired outer sole; providing an incompletely cured, moldable outer sole blank of selected elastomeric material; providing a thin ribbon of incompletely cured elastomeric material and of one of the colors which is to appear on the edge of the completed outer sole; assemblying therewith a thin paper ribbon of unspun fibrous cellulosic material; forming openings in the assembled ribbons in accordance with the pattern in which the second color is to appear on the edge of the outer sole; providing a thin imperforate and partially cured ribbon of an elastomer of said second color; so assembling the latter elastomer ribbon with the first that the paper ribbon is interposed between them; wrapping the composite ribbon, thus formed, about the outer sole blank so that the imperforate elastomeric ribbon contacts the edge of the blank; placing the assembly, including the blank and the assembled ribbons, in the mold cavity; subjecting the parts to heat and pressure thereby to cure the blank and conform it to the mold cavity; and concomitantly curing the elastomeric ribbons while the interposed paper ribbon prevents intermingling of the material of the elastomeric ribbons.

References Cited by the Examiner
UNITED STATES PATENTS

| | | | |
|---|---|---|---|
| 2,648,619 | 8/1953 | Alderfer | 264—258 |
| 2,763,028 | 9/1956 | Blake | 18—345 |
| 3,137,601 | 6/1964 | Menzer | 254—257 |

ROBERT F. WHITE, *Primary Examiner.*

T. J. CARVIS, *Assistant Examiner.*